(12) United States Patent
Mehta et al.

(10) Patent No.: US 9,038,025 B1
(45) Date of Patent: May 19, 2015

(54) TECHNICAL INTERACTION MODEL

(75) Inventors: Alok Mehta, Winnetka, IL (US); Mirza Pyarali Dharani, Vernon Hills, IL (US)

(73) Assignee: Allstate Insurance Company, Northbrook, IL (US)

( * ) Notice: Subject to any disclaimer, the term of this patent is extended or adjusted under 35 U.S.C. 154(b) by 148 days.

(21) Appl. No.: 13/479,757

(22) Filed: May 24, 2012

(51) Int. Cl.
*G06F 9/44* (2006.01)
(52) U.S. Cl.
CPC ........................ *G06F 8/10* (2013.01)
(58) Field of Classification Search
None
See application file for complete search history.

(56) References Cited

U.S. PATENT DOCUMENTS

| | | | |
|---|---|---|---|
| 5,355,317 A * | 10/1994 | Talbott et al. | 700/97 |
| 5,357,440 A * | 10/1994 | Talbott et al. | 700/97 |
| 5,500,800 A * | 3/1996 | Talbott | 700/99 |
| 6,766,509 B1 * | 7/2004 | Sheretov et al. | 717/123 |
| 7,340,469 B1 | 3/2008 | Alghathbar et al. | |
| 7,716,254 B2 | 5/2010 | Sarkar et al. | |
| 7,849,469 B1 | 12/2010 | Michel et al. | |
| 7,895,563 B2 | 2/2011 | Carlson et al. | |
| 7,954,083 B2 | 5/2011 | Berenbach et al. | |
| 7,984,436 B1 * | 7/2011 | Murray | 717/121 |
| 8,042,098 B2 * | 10/2011 | Do et al. | 717/123 |
| 8,321,803 B2 * | 11/2012 | Benedetti et al. | 717/121 |
| 8,413,115 B1 * | 4/2013 | Surprise et al. | 717/121 |
| 8,479,149 B2 * | 7/2013 | Kuriakose et al. | 717/120 |
| 8,650,539 B2 * | 2/2014 | Gobel | 717/120 |
| 2002/0170042 A1 * | 11/2002 | Do et al. | 717/143 |
| 2004/0199899 A1 * | 10/2004 | Powers et al. | 717/120 |
| 2004/0255272 A1 * | 12/2004 | Ondrusek et al. | 717/120 |
| 2005/0160411 A1 * | 7/2005 | Sangal et al. | 717/144 |
| 2005/0289513 A1 * | 12/2005 | Chen et al. | 717/121 |
| 2006/0123388 A1 | 6/2006 | Choi et al. | |
| 2006/0174222 A1 | 8/2006 | Thonse et al. | |
| 2007/0240111 A1 * | 10/2007 | Britton et al. | 717/120 |
| 2008/0235655 A1 | 9/2008 | Defour et al. | |

(Continued)

FOREIGN PATENT DOCUMENTS

| | | |
|---|---|---|
| CN | 101339534 | 1/2009 |
| CN | 101504610 A | 8/2009 |

(Continued)

OTHER PUBLICATIONS

Sabbaghian, N.; Eppinger, S.; Murman, E., Product development process capture and display using Web-based technologies, [Online] Oct. 1998, Systems, Man, and Cybernetics. 1998 IEEE International Conference on , vol. 3, [Retrieved from the Internet] <http://ieeexplore.ieee.org/stamp/stamp.jsp?tp=&arnumber=725062> pp. 2664-2669.*

(Continued)

*Primary Examiner* — Thuy Dao
*Assistant Examiner* — Ravi K Sinha
(74) *Attorney, Agent, or Firm* — Banner & Witcoff, Ltd.

(57) ABSTRACT

Methods, computer-readable media, and apparatuses provide a tool (e.g., a user interface) for capturing and managing requirements, such as nonfunctional requirements (NFRs). The tool may be used in the course of developing software or a system architecture to gather information for software developers, system architects, and others. In particular, a process is disclosed that includes a step of identifying interaction points, a step of developing an interaction grid (or matrix) defining interactions between the identified interaction points, and a step of ascertaining NFRs from a user for each interaction.

19 Claims, 10 Drawing Sheets

(56) References Cited

U.S. PATENT DOCUMENTS

| | | |
|---|---|---|
| 2009/0007073 A1 | 1/2009 | Huang et al. |
| 2009/0119637 A1 | 5/2009 | Ganapathy |
| 2009/0125892 A1 | 5/2009 | Crewdson |
| 2009/0138293 A1 | 5/2009 | Lane et al. |
| 2009/0249288 A1 | 10/2009 | Jin et al. |
| 2009/0313319 A1 | 12/2009 | Beisiegel et al. |
| 2009/0319313 A1* | 12/2009 | Subash et al. ............... 705/7 |
| 2010/0031247 A1 | 2/2010 | Arnold et al. |
| 2010/0042968 A1 | 2/2010 | Bugayenko |
| 2010/0077449 A1 | 3/2010 | Kwok et al. |
| 2010/0162200 A1 | 6/2010 | Kamiyama et al. |
| 2010/0218164 A1 | 8/2010 | Hsueh et al. |
| 2010/0250294 A1 | 9/2010 | Allam et al. |
| 2010/0306761 A1 | 12/2010 | Diament et al. |
| 2011/0016447 A1 | 1/2011 | Goel et al. |
| 2011/0066558 A1 | 3/2011 | Bassin et al. |
| 2011/0066661 A1* | 3/2011 | Sangal et al. ............. 707/805 |
| 2011/0082715 A1 | 4/2011 | Chen |
| 2011/0313750 A1 | 12/2011 | Song |
| 2012/0297364 A1* | 11/2012 | Wehrwein ............... 717/123 |
| 2013/0086553 A1* | 4/2013 | Grechanik ............... 717/123 |
| 2013/0111438 A1* | 5/2013 | Yoshimura et al. ........... 717/120 |
| 2013/0219362 A1* | 8/2013 | Cai et al. ................ 717/123 |
| 2014/0223410 A1* | 8/2014 | Hosono et al. ............. 717/104 |
| 2014/0331202 A1* | 11/2014 | Fukuda et al. ............. 717/123 |

FOREIGN PATENT DOCUMENTS

| | | |
|---|---|---|
| CN | 101741650 A | 6/2010 |
| JP | 2006127397 A | 5/2006 |
| JP | 2007305051 A | 11/2007 |
| JP | 2011145808 A | 7/2011 |
| KR | 20040024928 | 3/2004 |
| KR | 20070058943 A | 3/2008 |
| WO | 2004012110 A1 | 2/2004 |
| WO | 2011096314 A1 | 8/2011 |

OTHER PUBLICATIONS

Neeraj Sangal, Ev Jordan, Vineet Sinha, and Daniel Jackson; Using dependency models to manage complex software architecture, [Online] 2005, (OOPSLA '05). ACM, New York, NY, USA, [Retrieved from the Internet] <http://doi.acm.org/10.1145/1094811.1094824 > pp. 167-176.*

Yassine, A., An introduction to modeling and analyzing complex product development processes using the design structure matrix (DSM) method., [Online] 2004, Urbana 51.9 (2004), [Retrieved from the Internet] <http://ie406.cankaya.edu.tr/uploads/files/> pp. 1-17.*

LaMantia et al., Analyzing the Evolution of Large-Scale Software Systems Using Design Structure Matrices and Design Rule Theory, [Online] 2008, Software Architecture, 2008, Seventh Working IEEE/IFIP Conference on, [Retrieved from the Internet] <http://ieeexplore.ieee.org/stamp/stamp.jsp?tp=&arnumber=4459146> pp. 83-92.*

Sullivan et al., The structure and value of modularity in software design, [Online] 2001, (ESEC/FSE-9). ACM, New York, NY, USA, [Retrieved from the Internet] <http://doi.acm.org/10.1145/503209.503224 > pp. 99-108.*

McEwen, Scott, "Requirements: An introduction," IBM developerWorks, dated Apr. 16, 2004, http://www.ibm.com/developerworks/rational/library/4166.html (last visited May 23, 2012), 7 pages total.

Hoshing, Deepak et al., "Architecture Evaluation Model, QOS Capture & Architecture Evaluation Model," Infosys, pp. 1-8, dated Jun. 2010.

Grundy, John et al., "Directions in Engineering Non-Functional Requirement Compliant Middleware Applications," (2000).

* cited by examiner

500

| Interaction Point Number | Interaction Point Name |
|---|---|
| 1 | Call Center 414 |
| 2 | Customer Information Database 408 |
| 3 | Manager 404 |
| 4 | Customer Information Intake Server 405 |
| 5 | Request Handling Application 451 |
| 6 | Customer Information Intake Application 452 |
| 7 | Customer Information Retrieval Application 454 |
| 8 | Past Customer Function 457 |

| Question Number | Question/Directive | Customer Information Intake Server - Manager | Customer Information Intake Application – Request Handling Application |
|---|---|---|---|
| 1 | How many customers may access the database at one time? | | |
| 2 | | | |
| 3 | | | |
| 4 | | | |
| 5 | | | |
| 6 | | | |
| 7 | | | |
| 8 | | | |

TECHNICAL INTERACTION MODEL

FIELD OF ART

Aspects of the disclosure generally relate to the fields of data management and software/system architecture development. In particular, this disclosure provides a system architecture and/or software development tool that may be used to capture requirements related to a particular system or software throughout the various development stages of a project.

BACKGROUND

A system architecture is the fundamental organization of a system representing various components of the system, their relationships to each other and the environment, and the principles governing the system's design and evolution. Systems may comprise numerous entities, including applications, subsystems, components, web services, interfaces (e.g., application program interfaces (API) and other user interfaces (UI)), function calls, and any other element that is capable of interaction.

System architecture and software design typically involves the initial definition of functional (or behavioral) and non-functional requirements (NFRs). Functional requirements define what particular functions a system will offer, such as printing a document or sending a welcome email to a customer. Non-functional requirements define what a system is supposed to provide in terms of, for example, security, usability, testability, scalability, and maintainability. That is, NFRs refer to information describing constraints and qualities of a system. For example, NFRs may define particular hardware and software to be used as well as a desired response to scaling demands and system failures or flaws.

Ideally, system and software development processes would take into account all important NFRs and define NFRs that are specific, measurable, achievable, and testable. NFRs are often technical in nature and may heavily impact the resulting software and system architecture. A significant investment in resources, including time, money, and personnel, is commonly made to address NFRs. Some steps for gathering requirements (e.g., NFRs) include defining the scope of the system/software, selecting gathering techniques, conducting interviews and requirement workshops, prioritizing requirements, documenting the requirements, reviewing and analyzing the requirements, and validating the requirements.

During the requirements gathering process, it may be desirable to determine as much as possible about the interactions between entities (or parties) in a system or software. Moreover, it may be desirable to gather as many requirements as possible as early as possible in the system and/or software development cycle. Typically, system/software interactions are discovered relatively late in the development cycle. Indeed, some interactions may only be discovered as the system/software evolves. Late discovery of system/software interactions often results in inefficient use of development resources and added costs to development projects. As a result, it may be difficult to estimate the time and costs associated with developing systems and software, and therefore, also difficult to plan for the release of such systems and software.

Accordingly, new systems, devices, and methodologies are desired to facilitate early and/or complete capture of the interactions between parties of a system and/or software to be developed and requirements associated with such interactions.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, and apparatuses for providing a system architecture and/or software development tool configured to capture requirements related interactions between parties (or entities) of a system or software to be developed.

Aspects of this disclosure provide a tool (e.g., a user interface) for capturing and managing requirements, such as non-functional requirements (NFRs) (also known as system qualities, non-behavioral requirements, etc.). The tool may be used in the course of developing software or a system architecture to gather information for software developers, system architects, and others so that system/software interactions can be clearly identified and possibly discovered earlier. In some instances, the tool may include a Microsoft Excel document with one or more sheets (or worksheets). Also, the one or more sheets may contain links to other sheets within the document or macros that modify other sheets within the document.

Aspects of the disclosure also provide a process that includes steps of: identifying interaction points (e.g., identifying components/applications within a system by creating a list of the components/applications), developing an interaction grid (or matrix, table, spreadsheet, etc.) configured to define interactions between the identified interaction points (e.g., communication points between different components or applications within the same system/software architecture), and ascertaining NFRs from a user for each interaction. In some embodiments, the step of ascertaining NFRs may include creating fields for entries in response to questions divided into predefined categories.

In some embodiments, the tool may include a computer program/application that allows a plurality of software developers to share information regarding characteristics of their application, or a spreadsheet (or log) that system administrators (e.g., an IT department) might use to keep track of network connections within their system.

In some aspects of the disclosure, a development tool may include a processor and memory. The memory may include computer-executable instructions that, when executed by the processor cause the tool to receive names of a plurality of interaction points in a list on a first page, where each interaction point indicates the name of one of a component, application, subsystem, and functionality of a system or software architecture. The tool may further generate a matrix on a second page. The matrix may include a plurality of rows and columns defining a plurality of cells. Each row may have a row heading including one of the interaction points, and each column may have a column heading including one of the interaction points. Also, each cell may be configured to receive an input representing the existence of an interaction between two interaction points identified in the row and column headings of the corresponding cell. If one of the cells receives an input, the tool may generate a plurality of answer fields arranged adjacent to a plurality of previously drafted prompts (e.g., questions or directives) in a third page. The plurality of answer fields may be associated with a heading identifying the same interaction that is represented by the cell in which an input is received. Moreover, each of the answer fields may be configured to capture responses to the prompts regarding this interaction. For example, the answer fields may capture non-functional requirements.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited in the accompanying figures in which like reference numerals indicate similar elements and in which:

FIG. 5A illustrates an example list of interaction points in accordance with aspects of the present disclosure.

FIG. 5B illustrates an example state of a technical interaction model in accordance with aspects of the present disclosure.

FIG. 7A illustrates an example template in accordance with aspects of the present disclosure.

DETAILED DESCRIPTION

In accordance with various aspects of the disclosure, methods, computer-readable media, and apparatuses are disclosed that allow system architects and/or software developers to capture and organize requirements throughout the development cycle. System architects and software developers may use the methods, computer-readable media, and apparatuses disclosed herein in conjunction with other tools used in the development process. That is, the solutions provided herein, although capable of standing alone, may also be implemented with other tools (which may or may not be currently in use or available). For example, the methods, computer-readable media, and apparatuses may be implemented as add-ons to various applications or as a separately compiled application.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
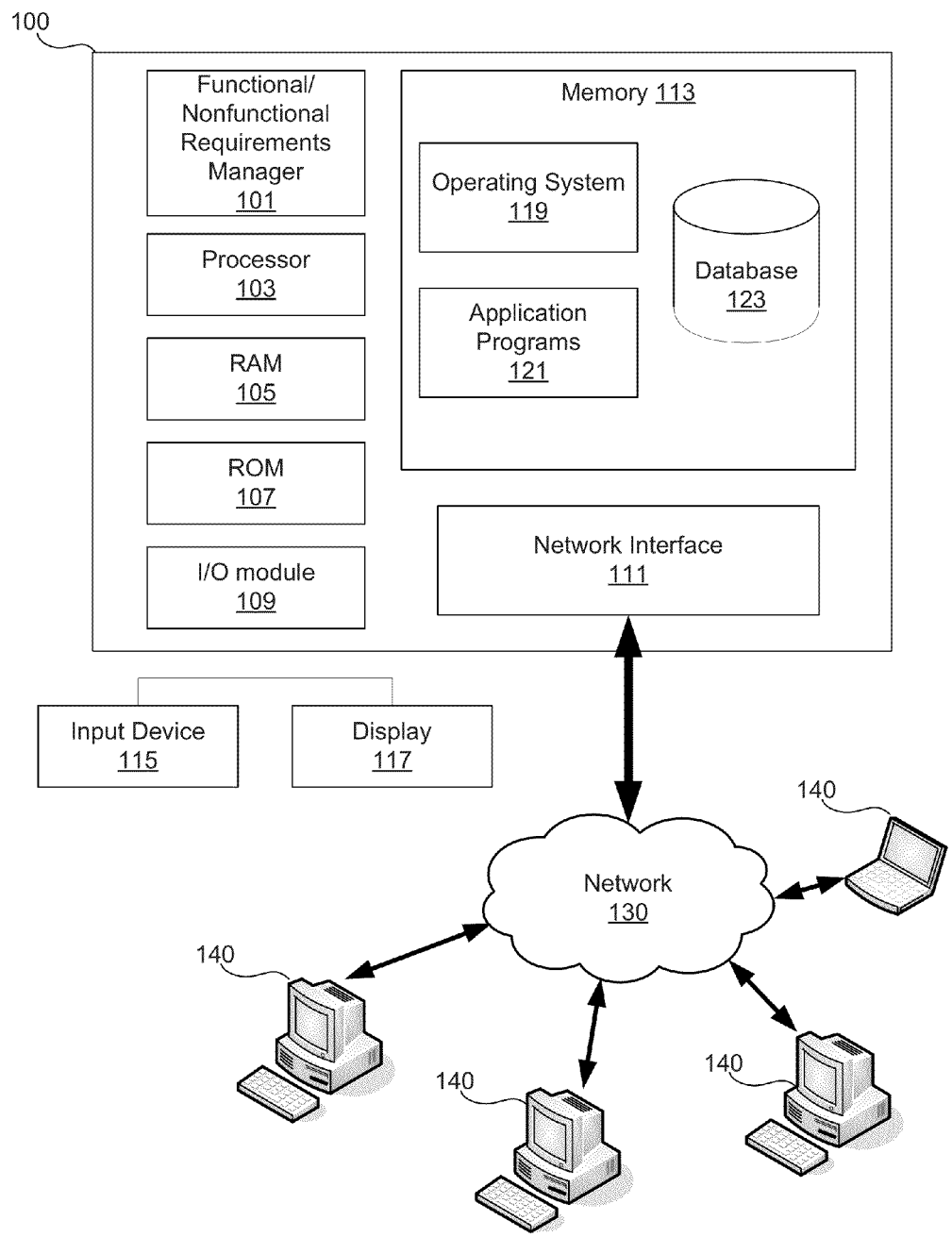
FIG. 1 is a block diagram of an example computing device that may be used according to an illustrative embodiment of the present disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a functional/non-functional requirements manager 101 for performing methods described herein. The functional/non-functional requirements manager 101 may be implemented with a processor and memory. Throughout this disclosure, the functional/non-functional requirements manager 101 may be used to reference both a combination of the processor and memory storing instructions executed by that processor and/or the instructions themselves. The processor of the functional/non-functional requirements manager 101 may operate in addition to or in conjunction with another processor 103 of the computing device 100. Both the functional/non-functional requirements manager 101 and the processor 103 may be capable of controlling operations of the computing device 100 and its associated components, including RAM 105. ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, system architects and/or software developers may enter or access various information, such as interaction points and functional/non-functional requirements, described in further detail below. Meanwhile, the display device 117 may assist the system architects and/or software developers in entering this information properly and efficiently and/or to review previously entered information throughout the development cycle of a project.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The computing device 100 may be a mobile device (e.g., a smartphone), and thus, may also include various other components, such as a battery, speaker, and antennas (not shown).

Figure 2:
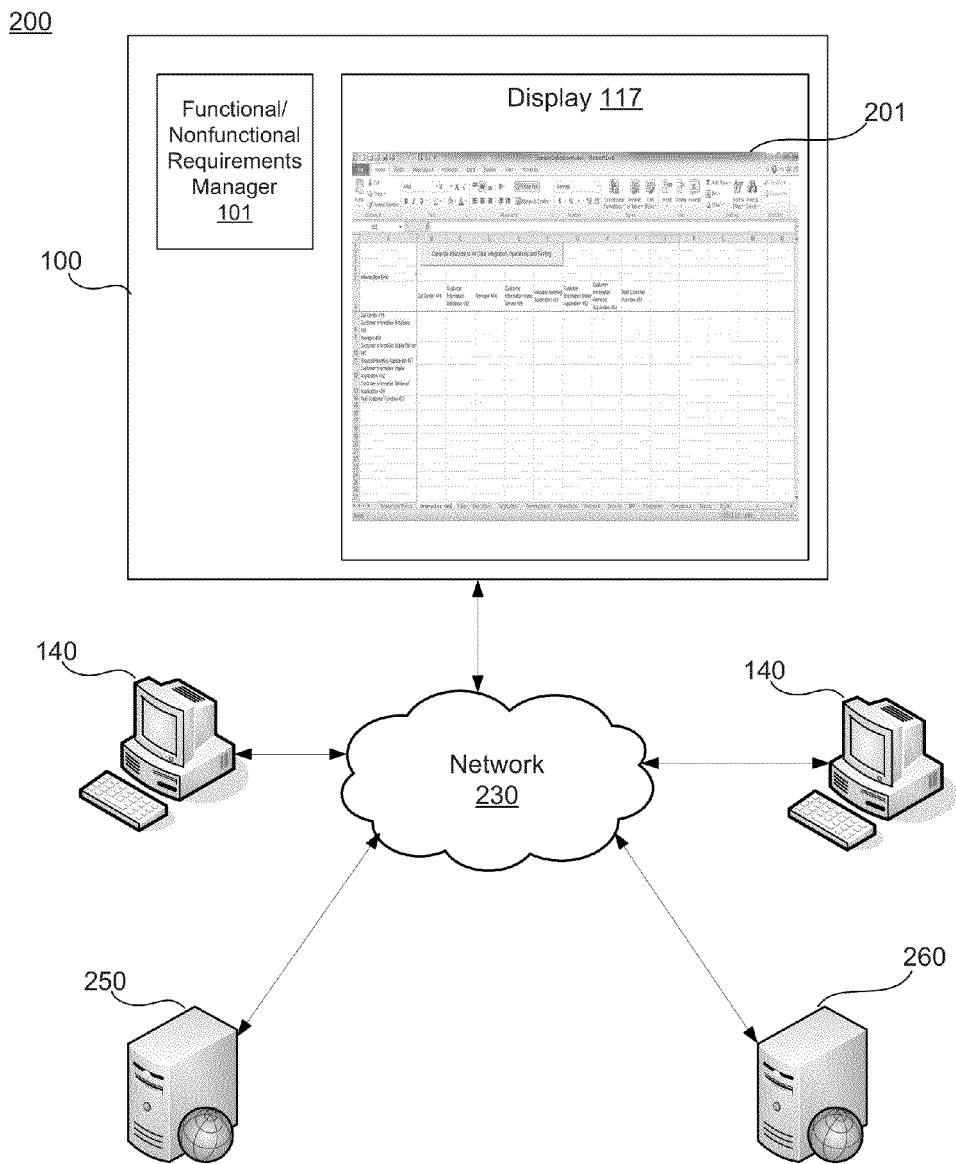
FIG. 2 illustrates an example system for implementing methods according to the present disclosure.

The development tool disclosed herein may be useful to more than one system architect and/or software developer involved with any particular project. Therefore, the development tool may be configured for operation by a number of users. FIG. 2 illustrates an example system 200 for implementing methods according to the present disclosure. As shown in FIG. 2, the system may include a computing device 100, one or more computing devices 140, a document server 250, and a backup server 260 all configured to connect to one another via a network 230. Also, although the document server 250 and backup server 260 are shown as single servers, it should be understood that they may each be implemented with multiple servers directly or indirectly connected to the network 230.

Referring to FIG. 2, the computing device 100 may be configured to display a technical interaction model 201. Therefore, the computing device 100 having the display 117 for displaying the technical interaction model 201 serves as a graphical user interface. The functional/nonfunctional requirements manager 101 or processor 103 may execute instructions to generate the technical interaction model 201 on the display 117 of the computing device 100. Specifically, the functional/nonfunctional requirements manager 101 or processor 103 may execute instructions to run an application (e.g., Microsoft Excel, Microsoft Word, Apple's Numbers, etc.), a web browser (e.g., Internet Explorer, Mozilla Firefox, Google Chrome, etc.), or a proprietary application built specifically for the present application to interpret the technical interaction model 201. Herein, the technical interaction model 201 may refer to the file including the data generating the content being displayed within the application or web browser. For example, where the technical interaction model 201 is viewed with Microsoft Excel, the technical interaction model 201 is the document data including the text, columns and rows, sheets, images, macros, etc. generated by opening a Microsoft Excel document (e.g., a document with a *.xls file extension). In addition, the technical interaction model 201 may also refer to the software application (i.e., computer-executable instructions) that provides the technical interaction model 201.

While FIG. 2 shows the functional/nonfunctional requirements manager 101 included within the computing device 100, it is contemplated that the functional/nonfunctional requirements manager 101 may be separate from the computing device 100. In some embodiments, the functional/nonfunctional requirements manager 101 may be located at a remote location connected to the computing device 100 via a network. Additionally, security measures may be implemented to limit operation of the functional/nonfunctional requirements manager 101. For example, a username and/or password may be required before the functional/nonfunctional requirements manager 101 will execute instructions to generate the technical interaction model 201. Where the functional/nonfunctional requirements manager 101 is remotely located, the username and/or password may be for a firewall blocking unauthorized access to the functional/nonfunctional requirements manager 101. In this manner, unauthorized users can be prevented from viewing the technical interaction model 201 and performing functions associated therewith.

As shown in FIG. 2, the computing device 100 may be connected to a document server 250 and a backup server 260 via the network 230, such as a LAN or the Internet. Other computing devices 140 may also be connected to the network 230. These other computing devices 140 may be used to access the technical interaction model 201.

In some embodiments, the document server 250 and backup server 260 may be in the same location and may even be integrated together. The document server 250 may include a storage device and firewall. The document server 250 may be configured to store the technical interaction model 201 in a central location for access by the computing device 100 and/or other computing devices 140. A user (e.g., a software developer) may operate one of the computing devices 100/140 to request the technical interaction model 201 from the document server 250.

In some arrangements, the document server 250 may include a firewall for determining whether the request should be granted (e.g., whether the user should be allowed access to the technical interaction model 201). Moreover, in some examples, the document server 250 may be configured so that only one copy of the technical interaction model 201 may be checked out to a user at a time. In this manner, the document server 250 may assist in ensuring that the technical interaction model 201 stays up to date with the information provided by a plurality of users.

Alternatively, the document server 250 may allow multiple copies of the technical interaction model 201 to be checked out at the same time, but may prevent the multiple copies from being edited. Specifically, the document server 250 may control access to certain documents, such as the technical interaction model 201, by certain computing devices 100/140. Moreover, a level of access (e.g., no access, read-only access, read/write access, etc.) may depend on the user logged onto the computing device 100/140. Some embodiments may allow the level of access to be changed by an administrator or other designated person (e.g., the creator of the document). Also, if a user in possession of a copy that cannot be edited wants to edit the copy, he/she may convert the copy into another version of the technical interaction model. The user may also store the newly created version onto the document server 250. Subsequently, the document server 250 may merge the newly created version of the technical interaction model with the original version of the technical interaction model so that the data in each can be combined. Further, the document server 250 may store the merged technical interaction model 201 and delete the original version and/or the new version to avoid confusion over which version is up to date. Having a single version of the technical interaction model 201 that all software developers and system architects can access and rely upon to receive system/software requirements may be desirable.

Additionally, in some instances, the document server 250 may encrypt the technical interaction model 201 using various known encryption methods. Where the technical interaction model 201 is encrypted, only users (e.g., software developers, system architects, etc.) having an encryption key may decrypt the technical interaction model 201 in order to access or edit its contents. Further, the technical interaction model

201 itself may include security measures, such as functions to prompt a user for an access code before granting a user permission to access or edit its contents. Also, depending on the access code received the technical interaction model 201 may grant different levels of access. For example, some users may be given permission to only view the contents, some may be given permission to only enter interaction points, and/or some may be given permission to edit the entire technical interaction model 201 including any nonfunctional requirements contained therein.

Further, the document server 250 may facilitate a "cloud" computing environment in which multiple users may access, manipulate, and/or edit the same document. Specifically, the document server 250 may permit the technical interaction model 201 to be accessed by a plurality of computing devices 100/140 at the same time and allow the plurality of computing devices 100/140 to edit the technical interaction model 201. For example, a user of one of the computing devices 100/140 may be able to enter NFRs into the technical interaction model 201, while another user on another of the computing devices 100/140 enters other NFRs into the technical interaction model 201. In one or more arrangements, the different entries may be made in different colors, fonts, sizes, etc. based on the author to distinguish the source of the entries. For example, an NFR provided by one software developer may be displayed with green colored text, while another NFR provided by another software developer may be displayed with red colored text.

Additionally, the document server 250 may be configured to periodically save a document (e.g., the technical interaction model 201), which is checked out, or a version of the document, so that information is not lost. Similarly, the system 200 may include a backup server 260 for backing-up the information stored on the document server 250 and/or the documents accessed by the computing devices 100/140. The backup server 260 may be configured to include intelligence to determine which documents need to be stored and which documents can be deleted because a newer version exists. The backup server 260 may also include a firewall for limiting access to the documents that it has backed-up.

In some embodiments, the network 230 may be the Internet and the document server 250 may be a web server for controlling access to the technical interaction model 201. In such embodiments, the technical interaction model 201 may be an HyperText Markup Language (HTML) file that, when interpreted by a web browser, allows the web browser to generate HTML elements (fields, links, text, images, etc.) to perform the functions described herein, such as receiving interaction points, generating a matrix, generating fields, and capturing NFRs. Accordingly, the technical interaction model 201 may be a web based tool for capturing NFRs. One of ordinary skill in the art should understand how to implement the various functions disclosed herein to provide a web based tool.

Figure 3:
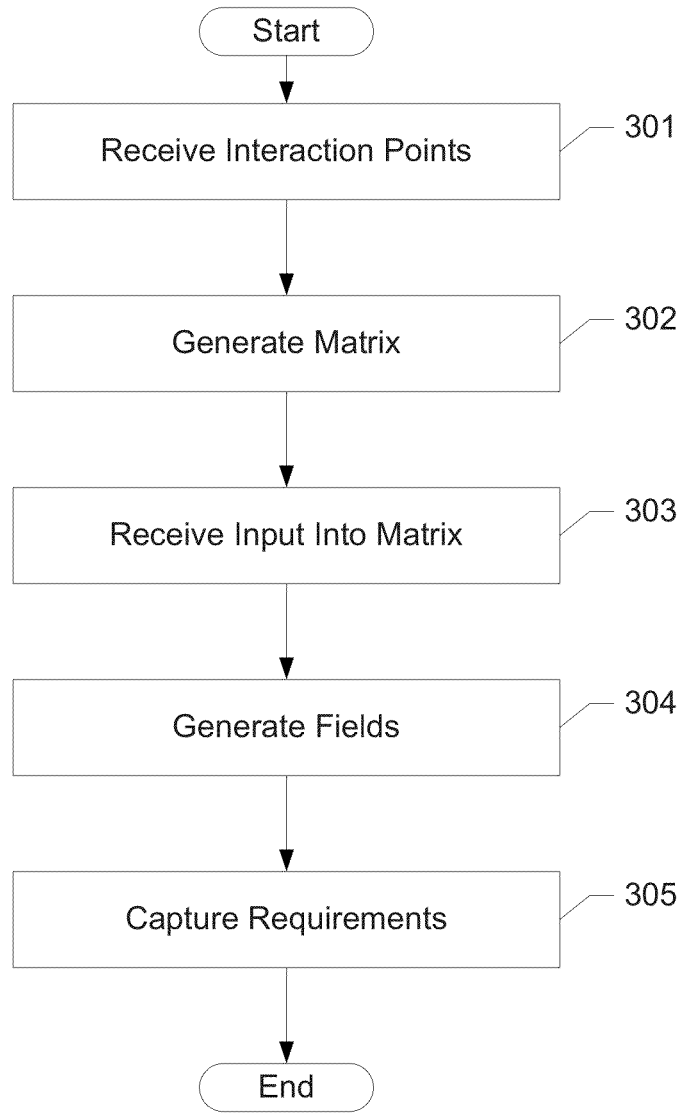
FIG. 3 illustrates a flow diagram for an example process in accordance with aspects of the present disclosure.

FIG. 3 illustrates a flow diagram for an example process in accordance with aspects of the present disclosure. More specifically, FIG. 3 illustrates a plurality of steps a computing device 100/140 may perform to assist in capturing requirements, such as NFRs, for system/software interactions. The steps of FIG. 3 are described below with reference to FIGS. 4A-7C. which illustrate various aspects of the present disclosure. As shown in FIG. 3, the process may begin with step 301 in which names of one or more interaction points are received. Herein, an interaction point may be any subsystem, component, application, or functionality that is a party to an interaction, which refers to a communication/interface between two or more interaction points within a system/software architecture.

Figure 4A:
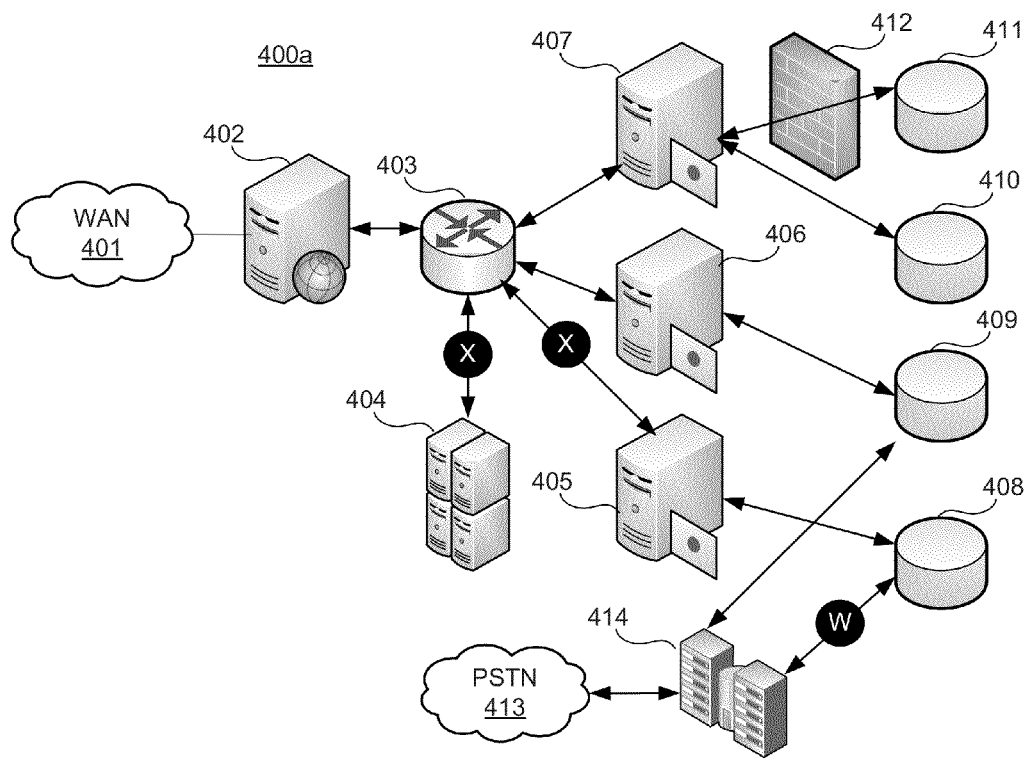
FIG. 4A is a high-level diagram illustrating an example system architecture.
Figure 4B:
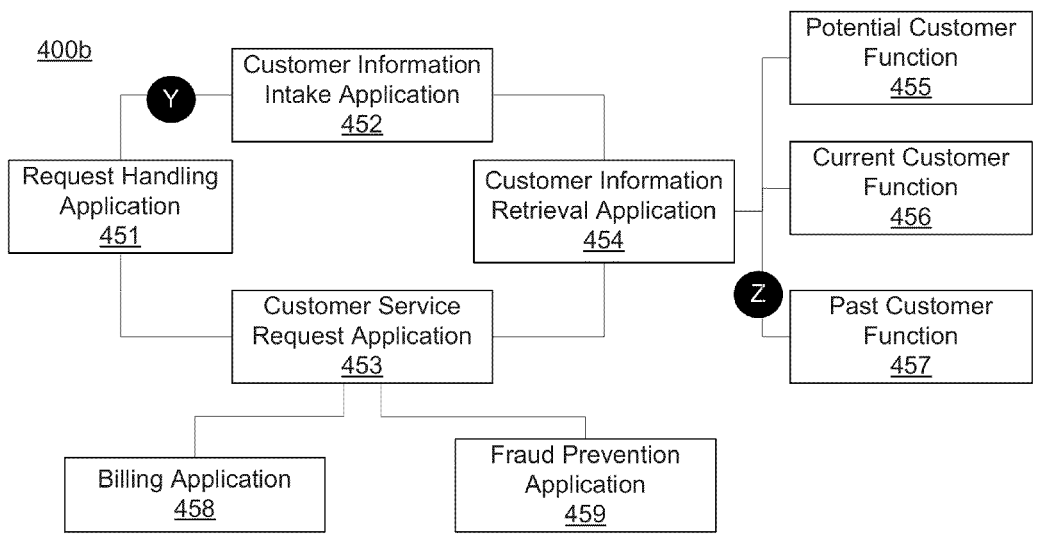
FIG. 4B is a high-level diagram illustrating an example software architecture.

FIG. 4A includes a high-level diagram of an example system architecture 400a and FIG. 4B includes a high-level diagram of an example software architecture 400b to illustrate interaction points and corresponding interactions. As shown in FIG. 4, the system architecture 400a includes WAN 401, an edge server 402, and a router 403. The router 403 may communicate with a manager 404 to determine where to route communications input from or output to the WAN 401. For example, the manager 404 may assist the router 403 in determining whether to route communications to a customer information intake server 405, a customer service request server 406, or a corporate information server 407. The customer information intake server 405 may communicate with a customer information database 408 and the customer service request server 406 may communicate with a customer service database 409. Meanwhile, the corporate information server 407 may communicate with both a public corporate information database 410 and a private corporate information database 411 through a firewall 412. In addition, the system architecture 400a may include a public switch telephone network (PSTN) 413 and a call center 414. The call center 414 may communicate with both the customer information database 408 and the customer service database 409. Notably, FIG. 4 identifies a first interaction "W" between the call center 414 and the customer information database 408. Accordingly, the first interaction "W" represents a transfer of information between two interaction points: the call center 414 and the customer information database 408. FIG. 4A also identifies a second interaction "X" between the manager 404 and the customer information intake server 405. As illustrated, the second interaction "X" identifies an indirect communication (e.g., through the router 403) between two interaction points: the manager 404 and the customer information intake server 405. Even though the manager 404 and customer information intake server 405 might not communicate directly, they may be interaction points to the same interaction (i.e., interaction "X") because they may exchange data packets (e.g., TCP packets, UDP packets, etc.) that are addressed to each other.

In comparison, FIG. 4B illustrates interaction points and corresponding interactions in a software architecture (e.g., one or more software programs) 400b. As shown in FIG. 4B, the software architecture includes a request handling application 451, a customer information intake application 452, customer service request application 453, a customer information retrieval application 454, a potential customer function 455, a current customer function 456, a past customer function 457, a billing application 458, and a fraud prevention application 459. Notably, FIG. 4B identifies a third interaction "Y" between two applications: the request handling application 451 and the customer information intake application 452. In the software architecture 400b, the request handling application 451 may initiate a customer information intake application 452 represented by the third interaction "Y," and therefore the request handling application 451 and the customer information intake application 452 are both interaction points as both are parties to the third interaction "Y." A fourth interaction "Z" may be between an application and a function called by that application. Because the customer information retrieval application 454 calls the past customer function 457, they are both interaction points related to the fourth interaction "Z."

In light of FIGS. 4A and 4B, it should be understood that a plurality of interactions may exist within any system or software architecture, and that the first through fourth interactions W, X, Y, and Z are simply a few examples. It should also be understood that structural elements, such as those shown in FIG. 4A and software applications and functions, such as those shown in FIG. 4B, may exist within the same architecture and may be parties to a shared interaction. For example, an interaction may occur between the customer information intake server 405 and the customer information intake application 452. Thus, an interaction point, a component, application, subsystem, or functionality will communicate (e.g., transfer information) with at least one other component, application, subsystem, or functionality. Further, the type of communication is not limited to any particular communication. The communication may be in one direction (e.g., one component may only be a receiving component and another component may only be a transmitting component) or may be bi-directional (e.g., both components may receive and transmit). Also, communications may include various protocols and may utilize physical and/or wireless connections. Thus, an interaction may exist wherever two interaction points are configured to receive and transmit information.

At step 301, interaction point names may be received by a computing device 100/140, and specifically, by a technical interaction model 201 displayed on the computing device 100/140. The act of receiving the interaction points may be performed in various manners. One manner may involve a user inputting the names of interaction points. For example, names of interaction points may be received as a result of a user typing names of interaction points using a keyboard connected to a computing device 100/140. Alternatively, receiving interaction points may include clicking and dragging previously entered names of interaction points using a mouse connected to a computing device 100/140. Another manner may include importing the names of interaction points from another file. The other file may or may not be of the same file type (e.g., have the same file extension) as the technical interaction model 201.

In some embodiments, the names of interaction points may be received by selecting interaction points from a diagram. A system may be outlined in a diagram, and from this diagram, a user may choose components, applications, subsystems, or functionalities to be interaction points. For example, a user may operate a mouse to click on a component of the diagram, and as a result, the name of that component may be transferred to the technical interaction model 201. Additionally, or alternatively, the application in which the diagram is constructed may automatically generate an interaction point from the diagram. For example, if a system architect draws a line connecting two components in a diagram of a system, thereby indicating an interaction between the two components, the application in which the diagram is formed may extract the names of the two components and input them into the technical interaction model 201. Thus, the technical interaction model 201 may be said to have received the names of interaction points.

It should be understood that the application used for forming the diagram may be the same as, or separately compiled from, the application for interpreting the interaction model 201. Where the applications are the same, selecting components from the diagram may cause the name of that component to be included in a designated list for receiving interaction points. In some embodiments, where the applications are the same, the technical interaction model 201 may be configured as an add-on to the application for forming the diagram. Specifically, the technical interaction model 201 may be generated by a script (e.g., a JavaScript) interpreted by the application in response to a user input. For example, a user may select a tool from a tool bar or drop-down menu within the application used to form the diagram thereby causing a script to interpret the technical interaction model 201.

On the other hand, where the applications are separately compiled, the application for interpreting the technical interaction model 201 may be configured to import and convert the data received from the application in which the diagram is formed. For example, an application used to design a system/software architecture may already include a list of components, applications, subsystems, and functionalities, and thus, the technical interaction model 201 may leverage the existing capabilities of such a design application by importing the list in step 301.

Further, in some embodiments, the received names of the interaction points may include names of all of the components, applications, subsystems, and/or functionalities in a system/software architecture. That is, the name of each component, application, subsystem, and/or functionality in a system/software architecture may be received and treated as though it is an interaction point whether or not it is a party to an interaction. If the received name refers to a component, application, subsystem, and/or functionality that is not actually an interaction point, it may be identified as such by performing the subsequent steps in the process of FIG. 3 described herein. Thus, the process of FIG. 3 may simply receive names of all components, applications, subsystems, and/or functionalities in a system/software architecture, and ignore those that are not actual interaction points in later steps.

Regardless of the manner used to input the interaction points, the technical interaction model 201 may be configured to organize the interaction points into a list. In some cases, the list may be numbered. FIG. 5A illustrates a list 500 of some of the interaction points identified in FIGS. 4A and 4B. As shown in FIG. 5A, the list 500 may identify the interaction points by the name of the component, subsystem, application, or functionality each interaction point represents. In some instances, the list 500 may identify the interaction points by the name of a component and a subsystem to which the component belongs, or by the name of an application and a function called by that application. For example, the past customer function 457 shown in FIG. 5A could instead be identified as "customer information retrieval application/past customer function." Different naming conventions may be preferred depending on the architecture at hand.

Additionally, while the list 500 arranges the interaction points vertically, it is not limited to such an arrangement. Further, the list 500 shows interaction point numbers (e.g., 1, 2 . . . 8) associated with the interaction points, but the numbers are also not required. One aspect of the list 500 is that each interaction point is included in a separate field 501. In whatever manner the interaction points are inputted, the technical interaction model 201 may assist in arranging the list 500 so that each interaction point is in a separate field 501. By including the interaction points in separate fields 501, the technical interaction model 201 may allow interaction points to be distinguished in subsequent steps.

FIG. 5B illustrates the technical interaction model 201 in a state in which it displays a list of the interaction points whose names it receives. As shown in FIG. 5B, the technical interaction model 201 may be implemented as an Excel document. As in FIG. 5A, FIG. 5B also shows the interaction points listed in respective fields 501 or cells. Further, FIG. 5B illustrates a button 502 for triggering the generation of a matrix (or creating an interaction grid). Clicking on this button (or otherwise selecting the button) may cause certain computer executable instructions to be executed by the functional/non-functional requirements manager 101 or the processor 103 of the computing device 100/140. For example, where the technical interaction model 201 is implemented as an Excel document, the button 502 may cause Microsoft Excel to run a macro. In other embodiments, selecting a button 502 may cause the technical interaction model 201 to run a script (e.g., a JavaScript). That is, the application used to generate the technical interaction model 201 may also execute a script to generate a matrix.

Figure 6A:
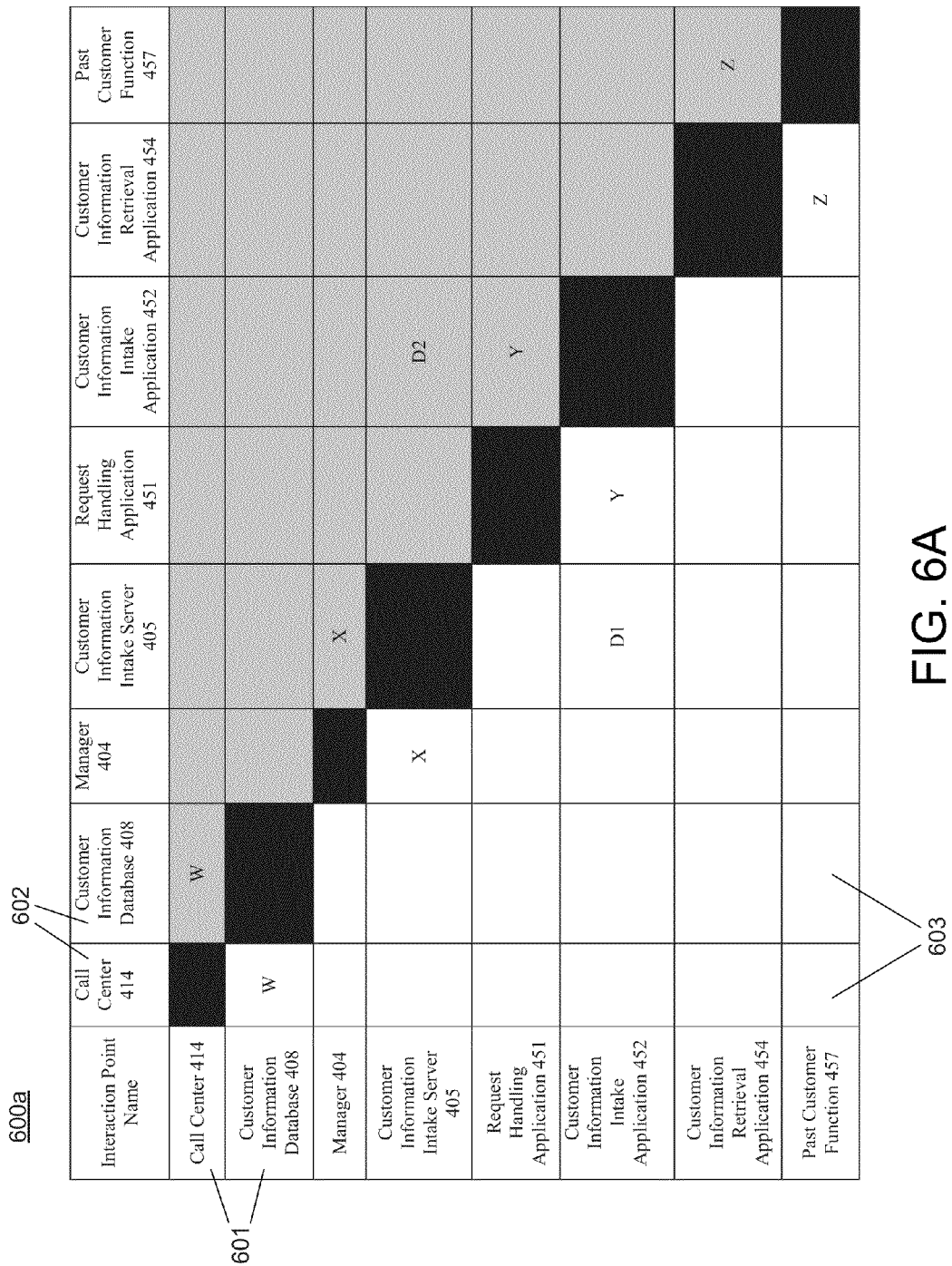
FIG. 6A illustrates an example matrix in accordance with aspects of the present disclosure.

Referring to FIG. 3, the received interaction point names are used to generate a matrix at step 302. FIG. 6A illustrates an example matrix 600a. As shown in FIG. 6A, the matrix 600a may include a row header 601 and a column header 602 for each received interaction point name. Further, the matrix 600a includes a plurality of cells 603 defined by the rows and columns. Specifically, a cell 603 is created at the intersection of two interaction points. Therefore, each cell 603 may represent a possible interaction between the interaction point identified in the row header and the interaction point identified in the column header. While the matrix 600a may create a cell 603 for a plurality of interactions, not all cells 603 will correspond to an actual interaction. The matrix 600a in FIG. 6A shows the cells 603 corresponding to the interactions W, X, Y, and Z identified in FIGS. 4A and 4B. Other cells 603 may or may not be actual interactions. Whether a cell 603 corresponds to an actual interaction may be decided by a user. The matrix 600a may help the user in recording actual interactions by inputting data into the cells 603 corresponding to actual interactions. Each cell 603 may be configured to accept a data entry. The data entry may be typed into the cell 603 or entered using a mouse or other stylus. In some embodiments, the cells 603 may include checkboxes, which generate a check in the checkbox when selected.

To generate the matrix 600a, a functional/nonfunctional requirements manager 101 or processor 103 may execute computer-executable instructions including an algorithm to convert the list 500 of interaction points into the matrix 600a of cells 603. The algorithm may arrange the row headings from top to bottom and the column headings from left to right in the order in which they are received or in the order in which they are arranged in the list 500. Alternatively, the algorithm may be modified to arrange the row headings and column headings to place the received interaction point names in alphabetical order. Such an arrangement may help a user to quickly locate a desired interaction point.

The number of cells 603 may depend on the number of interaction points. Where N interaction point names are received, a matrix with N rows and N columns is formed and the number of cells 603 is N×N. For example, because the names of eight interaction points were received in step 301, the matrix 600a is generated with sixty-four (=8×8) cells 603. In the matrix 600a, some of the cells 603 (shown as shaded for illustration purposes) may represent a duplicate interaction, while some of the cells 603 (filled with black (e.g., blacked-out) for illustration purposes) may not represent an interaction at all (e.g., where they are at the intersection of the same interaction point). It should be understood that the matrix 600a might not shade or fill the cells 603 that are duplicates or that do not represent interactions. However, in some embodiments, the computer executable instructions that provide the algorithm to generate the matrix 600a may identify the duplicate cells 603 and cells 603 that do not represent interactions, and shade or fill them (or otherwise point them out) automatically when the matrix 600a is generated. Instead of, or in addition to, filling or shading these cells 603, the matrix 600a may be generated so that these cells 603 are deactivated (e.g., cannot receive input or do not allow their inputs to be processed to form answer fields described below). Further, in one or more arrangements, the matrix 600a may be initially generated so that only cells 603 that do not represent interactions (e.g., cells defined by the same row heading and column heading) are blacked-out or deactivated. In such arrangements, the technical interaction model 201 may then later black-out, shade, or deactivate duplicate cells 603 as one of the duplicate cells 603 is chosen. For example, if cell D1 is chosen (i.e., data is entered into cell D1 or the cell D1 is otherwise selected), then the technical interaction model 201 may shade, black-out, or deactivate cell D2 because it is a duplicate of D1. Vice versa, if cell D2 was chosen first, the cell D1 might be shaded, blacked-out, or deactivated. As a result, the technical interaction model 201 may present a matrix 600a that shows a user which interactions have been addressed and which have not.

Figure 6B:
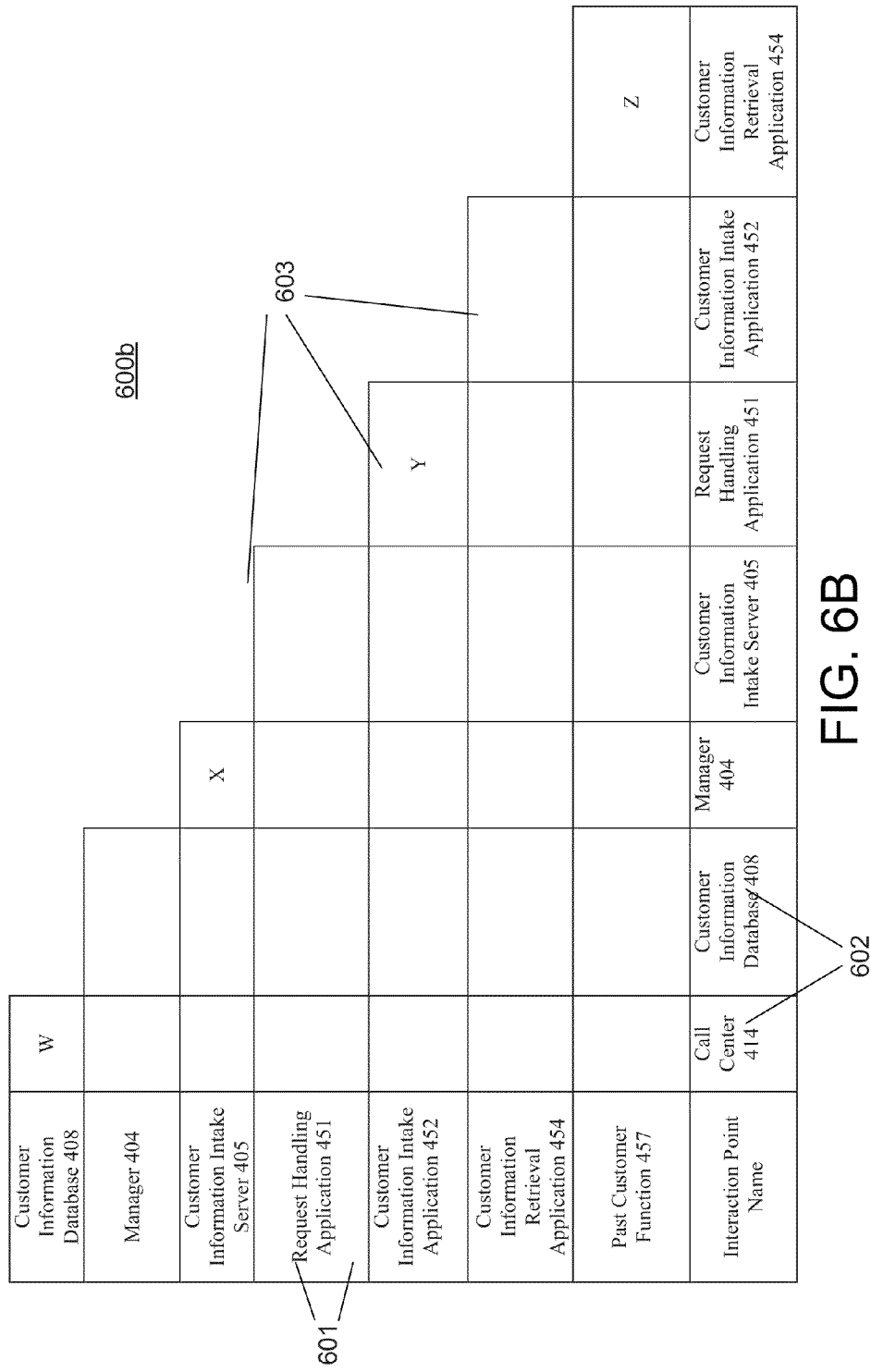
FIG. 6B illustrates another example matrix in accordance with aspects of the present disclosure.

FIG. 6B illustrates another example matrix 600b that may be generated at step 302. The matrix 600b is formed so that there are no duplicate cells or cells that do not represent an interaction. In an embodiment of the technical interaction model 201 that generates the matrix 600b, where N interaction point names are received, the technical interaction model 201 may generate N(N−1)/2 cells 603. Accordingly, as shown in FIG. 6B, when eight interaction point names are received, the technical interaction model 201 may generate the matrix 600b having 28 (=8*(8−1)/2) cells 603.

Figure 6C:
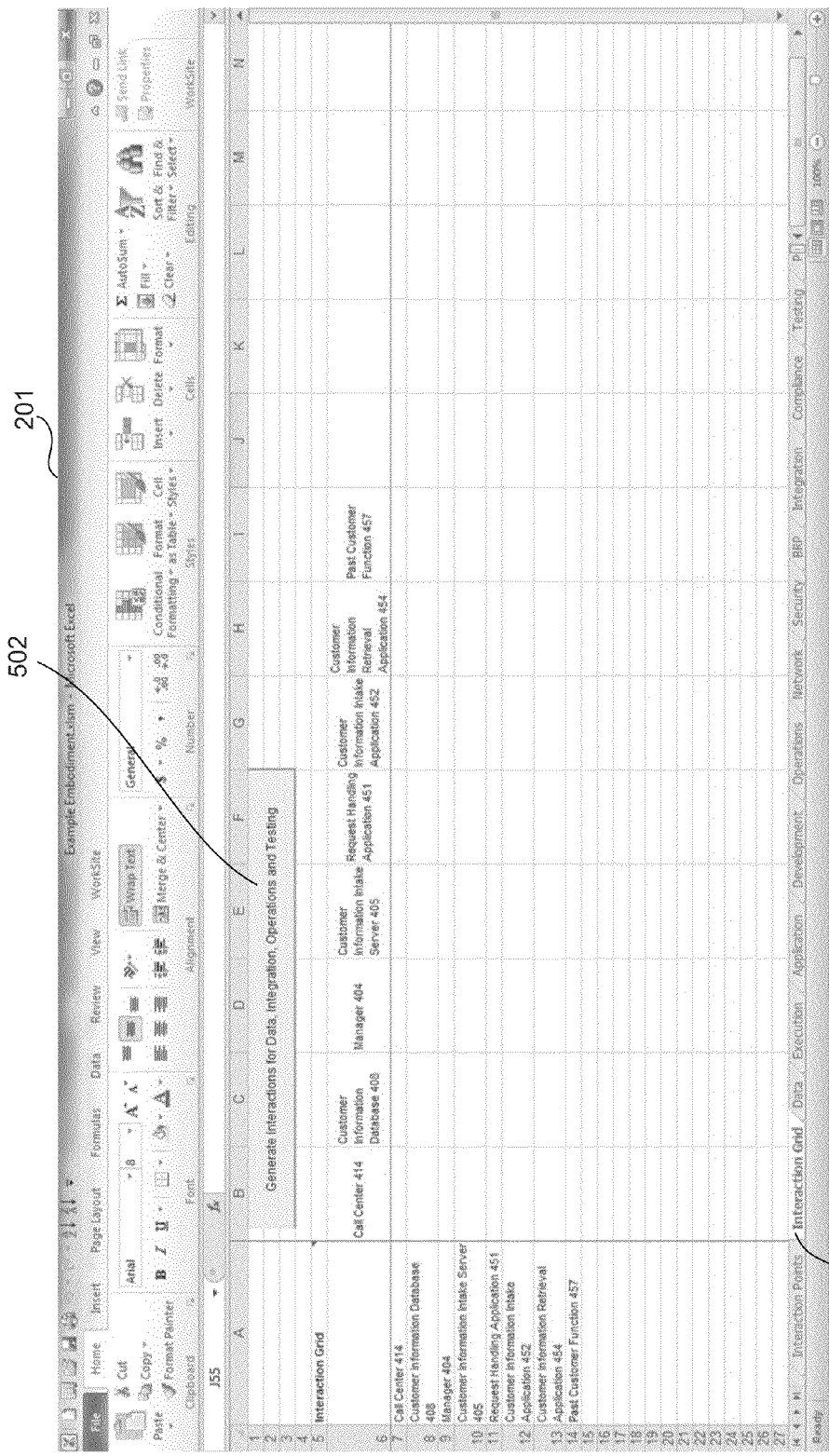
FIG. 6C illustrates another example state of a technical interaction model in accordance with aspects of the present disclosure.

FIG. 6C illustrates the technical interaction model 201 in a state in which it displays an interaction grid or matrix 600c. As shown in FIG. 6C, the technical interaction model 201 may be implemented as an Excel document and the matrix 600c may incorporate the cells of a sheet in Microsoft Excel. When the button 502 discussed above is selected (e.g., clicked on), the Microsoft Excel application may run a macro in the document that generates the matrix 600c in another sheet of the document.

Referring to FIG. 3, once a matrix 600a-c is generated at step 302, the technical interaction model 201 may receive inputs into the cells 603 of the matrix 600a-c at step 303. In step 303 of the process for capturing NFRs, a user may input data into one or more of the cells. Inputting data may include selecting a cell 603 and then typing information into the cell 603, clicking and dragging an icon or other information into the cell, and/or simply clicking the cell 603 and/or a checkbox (or radio button) in the cell 603). Although W, X, Y, and Z are shown in the matrix 600a, these characters may or may not be entered. Indeed, any character/symbol may be typed into the cells 603 to represent an interaction. For example, a "#" may be entered into any cell 603 representing an actual interaction.

Further, the data received in step 303 may be received from various sources. For example, one user may input data into one cell 603 and another user may input data into another cell 603. Moreover, the user input at step 303 may include deleting previously entered inputs. It is contemplated that data may be incorrectly (intentionally or unintentionally) entered into cells 603, and/or a system/software architecture may evolve and certain interactions may become obsolete or undesirable. Therefore, data may be deleted from cells 603 in step 303 as well.

Notably, not all cells 603 of the matrix 600a-c may receive data. In some examples, data may only be entered into cells corresponding to an interaction for which a user wishes to capture requirements. Leaving a cell 603 empty may indicate that an interaction between the interactions points defining that cell 603 does not occur. Also, where names of components, applications, subsystems, and functionalities are received in step 301, but are not actually interaction points, cells 603 for such components, applications, subsystems, and functionalities may be empty. Based on the empty cells 603, a component, application, subsystem, and/or functionality that is not an interaction point may be identified. In some cases, this identification may be made automatically by the functional/nonfunctional requirements manager 101 or processor 103 and outputted to a user. For example, the technical interaction model 201 may display that 3 of 25 interactions have been identified based on determining the total number of cells 603 in the matrix 600*a-c* and detecting how many cells 603 are in the matrix 600*a-c* include data. From this and similar outputs, a user may determine if interactions have not yet been accounted for or whether the received names in step 301 do not correspond to interaction points because they are not a party to an interaction.

In some embodiments, the technical interaction model 201 may highlight and/or color a cell 603 in which data has been entered. Such highlighting and/or coloring may automatically be performed by the technical interaction model 201 in response to one of the cells receiving an input. For example, if a user inputs data into a cell 603, that cell 603 may be filled in with the color green indicating that requirements for the corresponding interaction should be captured. Alternatively, a cell 603 may only be highlighted and/or colored after a user confirms that data has been intentionally input into the cell 603 or after a user selects a button, such as the button 604, to proceed to the next step. By highlighting and/or coloring cells 603, the technical interaction model 201 may produce a visual aid for assisting a user (e.g., a software developer) to identify which interactions have been addressed (e.g., evaluated for capture of NFRs).

Vice versa, a matrix 600*a-c* may be originally generated with highlighted and/or colored cells 603, such that entering data into one of the cells 603 changes the color of that cell 603. For example, the cells 603 of the matrix 600*a-c* may originally be filled with the color red and may be changed to the color green as data is entered into them.

In some embodiments, the matrix 600*a-c* may be generated by a matrix generation module. The matrix generation module may be a part of the functional/nonfunctional requirements manager 101 in some embodiments. Specifically, the matrix generation module may input the names of the received interaction points from memory. The interaction points may be inputted simultaneously or in series. Further, the matrix generation module may process the interaction points individually to create a row and column for each interaction point and to insert the name of the interaction point into the row and column headings of the newly created row and column. After creating a row and column and populating the row and column headings, the matrix generation module may move on to the next received interaction point and perform the same functions (e.g., create a row and column and populate the row and column heading with the name of an interaction point). For example, the matrix generation module may input the first interaction point in the list 500, process the first interaction point, input the second interaction point in the list, process the second interaction point, and so on. Upon completion of the process for each interaction point, the matrix generation module may output the matrix 600*a-c* for display, or for storage in computer memory. It should be understood that where the matrix generation module is described as creating rows and columns, it is generating data that may be converted to display the matrix 600*a-c*. Further, the matrix generation module may generate data to make the cells 603 interactive. That is, more than creating lines to form a grid of cells 603, the matrix generation module may enable the cells 603 to receive data input and store the data input to memory. In some examples, one or more memory cells from a block of memory (e.g., DRAM), may be allocated to a particular cell 603 of the matrix 600*a-c*. Therefore, each cell 603 may store data entered into the cell 603 in a memory cell having a specific memory address.

After step 303, the process may perform step 304 in which answer fields 701 are generated within a document or template. Specifically, the technical interaction model 201 may detect the entered data received in step 303 and generate answer fields 701 based on the data. For example, only those cells 603 of the matrix 600*a-c* that contain entered data may be used to generate the answer fields 701. The technical interaction model 201 may execute a script (e.g., a JavaScript) or other function for traversing the cells 603 of the matrix 600*a-c* to determine whether they contain entered data. Various algorithms and data structures (e.g., search trees, hash tables, arrays, etc.) may be used to implement this look-up for entered data. For each interaction identified by entering data into the matrix 600*a-c*, step 304 may generate one or more answer fields 701. However, in some instances, step 304 may not generate answer fields 701 for each interaction identified, if the interactions are the same (e.g., where data is entered in two different cells 603 that represent the same interaction (e.g., if the cells 603 are duplicates)).

In one or more arrangements, the answer fields 701 may be generated in response to selecting a button, such as the button 604 shown in FIG. 6C. Clicking on the button 604 of FIG. 6C may cause specific computer executable instructions to be executed to evaluate the matrix 600*a-c* to identify which interactions have been selected and to generate answer fields in one or more templates for capturing requirements related to the selected interactions. For example, where the technical interaction model 201 is implemented as an Excel document, the button 604 may trigger a macro to scan the cells 603 of the matrix 600*a-c* to detect which cells 603 include data entries. Further, the macro may extract the names of the interaction points defining the cells including entries and may generate answer fields 701 in templates under headings including the extracted names. In other embodiments, the technical interaction model 201 may include a button for causing a script (e.g., a JavaScript) or other function to run to achieve similar results as those of the macro.

In some embodiments, the technical interaction model 201 may generate the answer fields 701 within the same document as the document including the matrix 600*a-c*, while in other embodiments, the technical interaction model 201 may generate the answer fields 701 within a separate document (e.g., another document not containing the matrix 600*a-c*). A document may include multiple templates in different sections, forms, pages, etc. of the document. Therefore, in one or more arrangements, the names of the interaction points received in step 301 may be received in a first page of a document, the matrix 600*a-c* may be generated in a second page of the same document, and answer fields 601 may be generated in a third page of the same document. Moreover, the data entered into a single matrix 600*a-c* within one template may cause answer fields 701 to be formed in more than one other templates of the same document. For example, a matrix 600*a-c* in a second page may generate answer fields 701 on a third page, fourth page, fifth page, etc. of the same document.

The technical interaction model 201 may also determine whether step 304 is being performed for the first time using the matrix 600*a-c* or whether the matrix 600*a-c* is already associated with a document or template (e.g., determine whether the matrix 600*a-c* is being updated). If the matrix is already associated with another document or template, step 304 may access that document or template (even if it is not already open) and create answer fields 701 within the document or template.

Whether the answer fields 701 are being created in the document (or template) for the first time or being added to an already existing document (or template), the answer fields 701 may be associated with already existing questions. For example, step 304 may include opening a template that has one or more previously drafted prompts (e.g., questions or directives) and generating answer fields 701 alongside of each (or some) of the prompts in that template. Accordingly, the number of answer fields 701 generated may depend on the number of prompts in the template. FIG. 7A shows an example template (or document) 700a including a list of questions/directives previously prepared. Further, FIG. 7A also shows fields 701 next to each of the questions/directives. Notably, the answer fields 701 are configured to receive data/information regarding a corresponding question/directive for a particular interaction. For example, information field 701-x1 may be configured to receive an answer to question number 1 (e.g., "How many customers may access the database at one time?") with respect to interaction X.

Additionally, step 304 may generate answer fields 701 for each interaction identified in the matrix 600a-c. For example, if data is entered in cells 603 representing the interaction X and interaction Y, then fields 701x and 701y for each of the questions with respect to each of the interactions X and Y are generated in the same template. To indicate the association between the answer fields 701 and the interactions, step 304 may create headings (row or column headings) in the template. For example, as shown in FIG. 7A, step 304 may create the column heading of "Customer Information Intake Server—Manager" indicating an interaction X between interaction point "Customer Information Intake Server" and interaction point "Manager," and the column heading of "Customer Information Intake Application—Request Handling Application" indicating an interaction Y between interaction point "Customer Information Intake Application" and interaction point "Request Handling Application." Although FIG. 7A shows the interactions being identified with column headings it should be understood that the questions may form column headings and the interactions may be identified with row headings.

Furthermore, another aspect of step 304 may be to generate answer fields 701 in multiple templates 700 or documents. The questions/directives may be organized into a plurality of categories, which may be arranged in individual templates 700 or documents. For example, questions/directives regarding security aspects of an interaction may be in one template 700 or document, while questions/directives regarding testing aspects of an interaction may be in another template 700 or document. Therefore, in some embodiments, step 304 may generate answer fields 701 in both a security template and testing template for the same interaction (e.g., interactions W, X, Y, and Z). Various software/system architectures may be broken down into various categories. The technical interaction model 201 may allow a user to choose categories in which NFRs should be captured. For example, the user may determine that NFRs related to testing, but not security are desirable, and therefore, may control the interaction model 201 to only generate answer fields 701 in a template associated with the testing category.

In some embodiments, for each interaction selected in the matrix 600a-c, answer fields 701 may be created in each of a plurality of templates associated with selected categories. For example, answer fields 701 associated with both interaction "X" and interaction "Y" may be included in both a testing template and a security template.

Figure 7B:
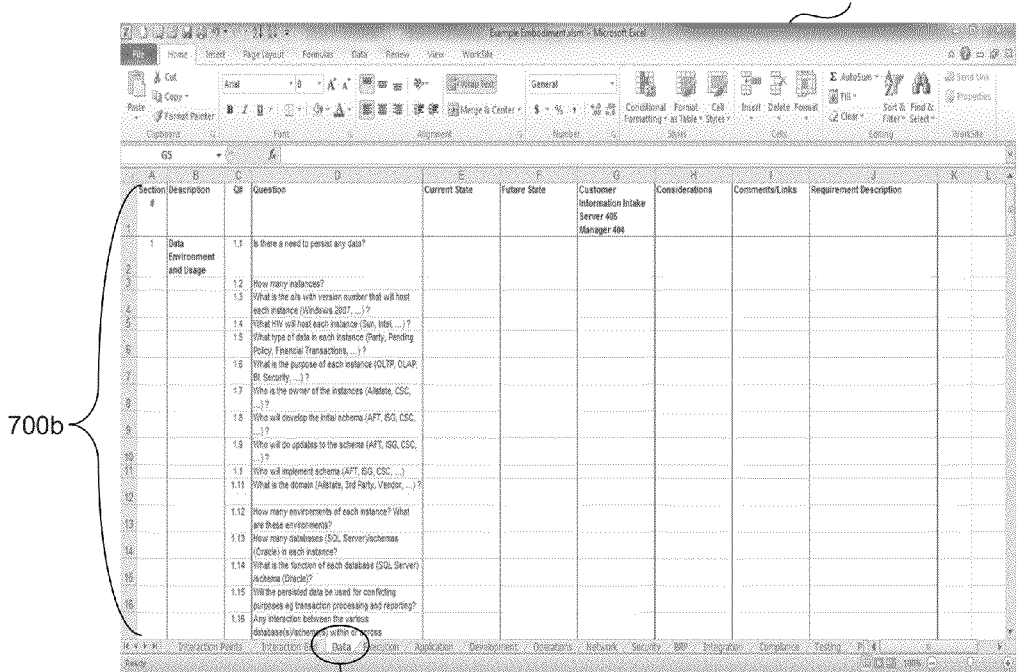
FIG. 7B illustrates yet another example state of a technical interaction model in accordance with aspects of the present disclosure.

FIG. 7B illustrates the technical interaction model 201 in a state in which it displays an example template 700b for capturing NFRs, and specifically for capturing NFRs related to a category named "Data." As shown in FIG. 7B, the template 700b may be an Excel worksheet with the name "Data" on the worksheet's tab as indicated by reference character C1. From FIG. 7B, it can be seen that a number of categories C of questions may be prepared in respective Excel worksheets, which may be navigated using tabs with names of the corresponding worksheet. Specifically, FIG. 7B illustrates that the questions may be divided into DEADONS and/or BICT categories (which are acronyms for category names of two different frameworks/models; DEADONS stands for Data considerations, Execution environment, Application development, Development methodology, Operational readiness, Network impacts, Security considerations; and BICT stands for Business resumption plan, Integration considerations, Compliance considerations, Testing considerations). It should be understood that these categories are used by way of example, and that the questions may be separated into other categories and that there is no restriction on the number of categories. Also, while each category is shown as being on its own individual worksheet, it should be understood that one or more of the categories may be combined so that their questions appear on a common worksheet.

The interaction between the customer information intake server 405 and manager 404 (i.e., interaction "X") is also shown in FIG. 7B as the column heading in column G. Here, column G may be created in response to receiving data into a cell 603 of a matrix 600c representing interaction "X." Initially, the template 700b shown in FIG. 7B might not have a column G for the interaction "X." But, when a user subsequently wishes to capture NFRs for the interaction "X," the user may enter data into a cell 603 of the matrix 600c corresponding to the interaction "X" to generate the column G in template 700b. Therefore, column G may be specifically created for the purpose of capturing NFRs for interaction "X." NFRs related to interaction "X" may be captured by entering information into the answer fields 701 (or cells) in column G. FIG. 7B further shows that the template for capturing NFRs may include other columns in addition to the column G for the interaction "X." For example, the template may include a column for capturing NFRs in a current state and a column for capturing NFRs in a future state. Moreover, FIG. 7B illustrates that the questions within the category (e.g., the "Data" category) may be broken down into sections.

Figure 7C:
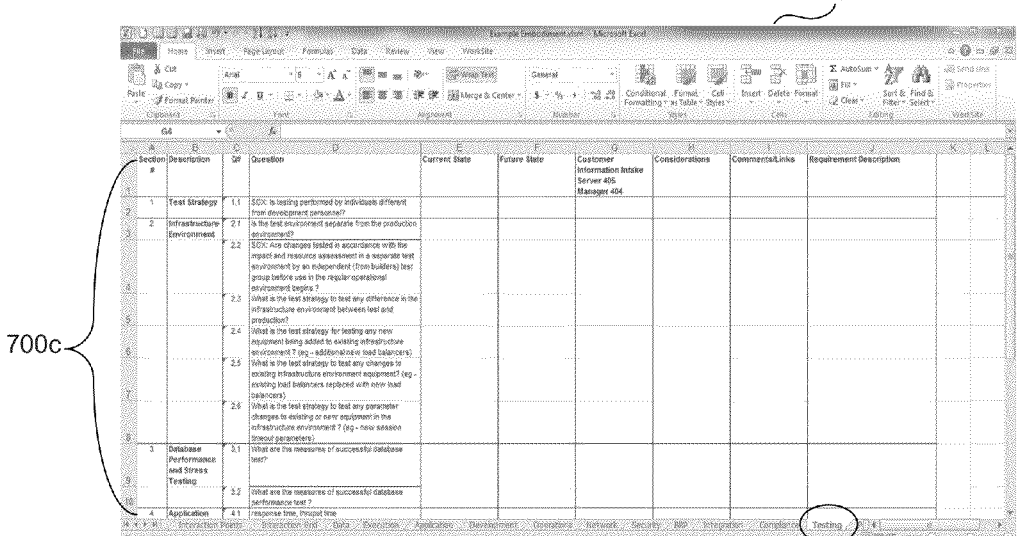
FIG. 7C illustrates still another example state of a technical interaction model in accordance with aspects of the present disclosure.

FIG. 7C illustrates another example template 700c displayed by the same embodiment of the technical interaction model 201 that displayed the template 700b in FIG. 7B. Specifically, FIG. 7C shows an Excel worksheet for capturing NFRs related to a category named "Testing," which is shown on the worksheet's tab as indicated by reference character C2. The questions/directives in the "Testing" worksheet shown in FIG. 7C may be different from those of the "Data" worksheet shown in FIG. 7B. While the questions may change, the column headings in the "Testing" worksheet and "Data" worksheet may be the same. In particular, FIG. 7C may include a column G for capturing NFRs specifically related to the interaction "X." Notably, column G in the "Testing" worksheet may be generated in response to the same act of receiving data as column G in the "Data" worksheet. That is, column G in the "Testing" worksheet may be generated in response to receiving input data in a cell 603 of the matrix 600c corresponding to the interaction "X." Accordingly, by inputting one piece of data into one cell 603 in the matrix 600c, multiple columns (e.g., column G), including one or more answer fields 701, may be generated in certain templates. Notably, questions/directives for one or more categories may not be applicable to interactions, and therefore, a user may select certain templates that fields may be created in so that unnecessary fields are not created in unselected templates. In the embodiment illustrated by FIGS. 7B and 7C, fields for the capture of NFRs related to the interaction "X" may be generated in the "Data" worksheet, the "Testing" worksheet, and other selected worksheets depending on the macro executed in response to entering data into a corresponding cell 603 of the matrix 600c and selecting the button 604.

In some embodiments, the templates 700 and/or answer fields 701 may be generated by a template/answer field generation module. The template/answer field generation module may be a part of the functional/nonfunctional requirements manager 101. Specifically, the template/answer field generation module may input, from memory, a matrix 600a-c generated in step 302. Here, inputting the matrix 600a-c into the template/answer field generation module may include the template/answer field generation module reading the memory cells of a block of memory designated for the matrix 600a-c. In some embodiments, the memory cells may be read one at a time. For example, where data for each cell 603 of the matrix 600a-c is stored in one memory cell, the template/answer field generation module may read the one memory cell and determine whether its read value is a logic high value (e.g., '1') or logic low value (e.g., '0'). If the read value of the memory cell is a logic high value, the template/answer field generation module may determine that the cell 603 corresponding to the read memory cell includes a data entry. In contrast, if the read value of the memory cell is a logic low value, the template/answer field generation module may determine that the cell 603 corresponding to the read memory cell is empty. Where multiple memory cells correspond to a single cell 603 of the matrix 600a-c, the determination may be made by, e.g., simultaneously reading the corresponding memory cells.

In response to determining that data has been entered into a cell 603, the template/answer field generation module may extract the names in the row and column headings of the matrix 600a-c. Specifically, the template/answer field generation module may determine the memory addresses of the corresponding row and column headings and read out the names stored therein. Meanwhile, the template/answer field generation module may allocate memory for creating answer fields 701 in a template 700. Where no template 700 previously exists, this allocation may also include allocating memory for a new template 700 and populating the new template 700 pursuant to computer-executable instructions specifically designed to populate the new template 700 with predefined questions/directives. Subsequently, the template/answer field generation module 701 may write the extracted names of the row and column headings into a portion of the allocated memory. Moreover, in addition to allocating memory for the answer fields 701, the template/answer field generation module may generate data to display the answer fields adjacent to the questions/directives so that users may visually correlate the questions/directives with the answer fields 701. Thus, when called upon, the template/answer field generation module may output data to display a template 700 with answer fields 701 in which users may enter function/nonfunctional requirements in response to predefined questions/directives.

Finally, in step 305, requirements, such as NFRs, may be captured. One or more users (e.g., software developers, system architects, etc.) may respond to the questions/directives in the respective answer fields 701 generated in step 304. The responses entered into the answer fields 701 may include text, images, links (e.g., hyperlinks to web pages), etc. In some embodiments, the entries may be color coded to identify the authors of the entries. For example, entries made by one system architect may appear in red font, while entries made by a second system architect may appear in blue font. Accordingly, a user may be able to identify and notify the author of a particular response when a user has a question or believes there is a conflict or mistake related to the response.

After a user enters information into the answer fields 701, the user may choose to store the information in the answer fields 701. Therefore, the technical interaction model 201 may include a button or other means to allow the user to trigger the technical interaction model 201 to store the information entered into the answer fields 701. Thus, system architects and software developers may return to the technical interaction model 201 as they wish to review and update the requirements stored in the answer fields 701. Moreover, as the development cycle progresses, the technical interaction model 201 may be modified to merge requirements for additional interactions with the requirements already captured. One aspect of the technical interaction model 201 may be that a user can make many corrections or updates to the information in the technical interaction model 201 by making only a few changes. For example, a user can change the name of an interaction point in the list 500, and that name change may be reflected in the matrix 600a-c and any templates 700 including the interaction point name. In short, the technical interaction model 201 may provide a single reference for capturing and updating requirements, such as NFRs, throughout the development cycle of a system/software architecture.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method, comprising:
receiving a plurality of interaction point names of interaction points, each interaction point including one of a component, application, subsystem, and functionality of a system or software architecture;
generating, by a computer processor using a matrix generation module, a matrix, including a plurality of rows and columns defining a plurality of cells, each cell representing an interaction between two of the interaction points, each row having a row heading corresponding to one of the interaction point names, and each column having a column heading corresponding to one of the interaction point names;
scanning, by the processor, the matrix to detect whether one or more of the cells include an input, the cells representing interactions between the interaction points identified in corresponding row and column headings;
in response to detecting that a particular cell, among the cells, includes an input, generating, in a template by the processor using an answer field generation module, a new column adjacent to a previously existing column of the template, wherein the previously existing column comprises a first plurality of prompts, and wherein the new column comprises a heading identifying a particular interaction represented by the particular cell and a plurality of fields; and capturing requirements for developing one of a software program and system architecture within the plurality of fields.

2. An apparatus, comprising:

a processor; and memory storing computer-executable instructions that, when executed by the processor, cause the apparatus to:

receive a plurality of names of interaction points into fields of a list at a first location, each interaction point including one of a component, application, subsystem, and functionality of a system or software architecture;

generate a matrix at a second location, the matrix including a plurality of rows and columns defining a plurality of cells, each row having a row heading corresponding to one of the names of the interaction points, and each column having a column heading corresponding to one of the names of the interaction points;

receive an input in a target cell from among the plurality of cells, the target cell representing an interaction between the interaction points included in the row and column headers of the target cell; and after receiving the input in the target cell, generate, in a table at a third location, a new column adjacent to a previously existing column of the table, wherein the previously existing column comprises a plurality of previously drafted prompts, and wherein the new column comprises a heading identifying the interaction represented by the target cell and a plurality of answer fields arranged adjacent to the plurality of previously drafted prompts, respectively, the plurality of answer fields configured to capture responses to the plurality of previously drafted prompts.

3. The apparatus of claim 2, wherein the computer-executable instructions, when executed, further cause the apparatus to display a user interface comprising the fields of the list and to configure the fields to accept, from a user, the names of interaction points, wherein a number of the rows is equal to a number of the received names of interaction points and a number of the columns is equal to the number of the received names of interaction points, wherein the computer-executable instructions, when executed, further cause the apparatus to display a first button that when selected causes the computer-executable instructions to generate the matrix, and wherein the computer-executable instructions, when executed, further cause the apparatus to display a second button that when selected causes the computer-executable instructions to generate the plurality of answer fields.

4. The apparatus of claim 2, wherein the computer-executable instructions, when executed, further cause the apparatus to:

receive a second input in a second target cell from among the plurality of cells, the second target cell representing a second interaction different from the interaction represented by the target cell; and after receiving the second input in the second target cell, generate, in the table at the third location, a second new column adjacent to the new column, wherein the second new column comprises a heading identifying the second interaction represented by the second target cell and a second plurality of answer fields arranged in line with the plurality of previously drafted prompts, respectively, and the second plurality of answer fields are configured to capture responses to the plurality of previously drafted prompts.

5. The apparatus of claim 2, wherein the computer-executable instructions, when executed, further cause the apparatus to:

after receiving the input in the target cell, generate, in a second table at a fourth location, a second new column adjacent to a second previously existing column of the second table, wherein the second previously existing column comprises a second plurality of previously drafted prompts, and wherein the second new column comprises the heading identifying the interaction represented by the target cell and a second plurality of answer fields arranged adjacent to the second plurality of previously drafted prompts, respectively, the second plurality of answer fields configured to capture responses to the second plurality of previously drafted prompts.

6. The apparatus of claim 5, wherein the plurality of previously drafted prompts and the second plurality of previously drafted prompts belong to different categories of prompts.

7. The apparatus of claim 2, wherein the first location, second location, and third location are on a first page, second page, and third page, respectively, and wherein the first page, second page, and third page are web pages or separate sheets within one document.

8. The apparatus of claim 2, wherein the computer-executable instructions, when executed, further cause the apparatus to:

traverse the matrix to identify which of the plurality of cells include inputs, wherein generating the new column comprises adding the new column to the table in response to identifying the input in the target cell, the table comprising the plurality of previously drafted prompts in respective rows of the previously existing column.

9. The apparatus of claim 2, wherein the computer-executable instructions, when executed, further cause the apparatus to:

traverse the matrix to identify whether any interactions are selected based on whether any of the plurality of cells have an input; and for each of the interactions selected, generate a column comprising answer fields arranged in line with the plurality of previously drafted prompts.

10. The apparatus of claim 2, wherein the computer-executable instructions, when executed, further cause the apparatus to:

in response to receiving the input in the target cell, change a display of the target cell from an empty cell to a marked cell to indicate selection of the target cell by a user; and in response to receiving a second input in the target cell after receiving the input in the target cell, change the display of the target cell from the marked cell to the empty cell and delete the new column from the table.

11. A non-transitory computer readable storage medium storing computer-executable instructions that, when executed by a processor, cause a computing device to:

receive a plurality of names of interaction points, each interaction point including one of a component, application, subsystem, and functionality of a system or software architecture;

generate a matrix, including a plurality of rows and columns defining a plurality of cells, each cell representing an interaction between two of the interaction points, wherein the matrix is generated by creating a column heading for each of the columns and a row heading for each of the rows, each of the column and row headings including one of the names of the interaction points;

receive an input in at least one of the cells, the cells representing interactions between the interaction points identified in corresponding row and column headings; and in response to detecting the input in a particular cell, generate, in a document, a new column adjacent to a previously existing column of the document, wherein the previously existing column comprises a first plurality of prompts, and wherein the new column comprises a heading identifying a particular interaction represented by the particular cell and a first plurality of fields configured to capture information regarding the first plurality of prompts.

12. The non-transitory computer readable storage medium of claim 11, wherein the first plurality of fields correspond to the first plurality of prompts, respectively, wherein at least one of the first plurality of prompts comprises a question, and wherein each of the first plurality of fields is associated with an interaction between two of the interaction points.

13. The non-transitory computer readable storage medium of claim 11, wherein the computer-executable instructions, when executed, further cause the computing device to receive and store information in at least one of the fields.

14. The non-transitory computer readable storage medium of claim 13, wherein the received information is a non-functional requirement for developing one of a software program and system architecture.

15. The non-transitory computer readable storage medium of claim 11, wherein the names of the interaction points are received in a first page of the document, wherein the matrix is generated in a second page of the document, and wherein the first plurality of fields are generated in a third page of the document.

16. The non-transitory computer readable storage medium of claim 11, wherein the computer-executable instructions, when executed, further cause the computing device to:

generate a second plurality of fields in the document in response to detecting the input in the particular cell, wherein the document includes a second plurality of prompts and each of the second plurality of fields corresponds to a respective one of the second plurality of prompts.

17. The non-transitory computer readable storage medium of claim 11, wherein the computer-executable instructions, when executed, further cause the computing device to:

generate a second plurality of fields in a second document in response to detecting the input in the particular cell, wherein the second document includes a second plurality of prompts and each of the second plurality of fields corresponds to a respective one of the second plurality of prompts.

18. The non-transitory computer readable storage medium of claim 11, wherein the computer-executable instructions, when executed, further cause the processor to store each of the plurality of names of the interaction points at a respective address.

19. The non-transitory computer readable storage medium of claim 11, wherein the computer-executable instructions, when executed, further cause the processor to shade or deactivate a second cell in the matrix associated with the same two interaction points as the particular cell in response to receiving the input in the particular cell.

* * * * *